United States Patent
Rinaldi

(10) Patent No.: US 10,096,423 B2
(45) Date of Patent: Oct. 9, 2018

(54) ELECTRONIC DIRECT VOLTAGE TRANSFORMER

(71) Applicant: Vito Rinaldi, Markham (CA)

(72) Inventor: Vito Rinaldi, Markham (CA)

( * ) Notice: Subject to any disclaimer, the term of this patent is extended or adjusted under 35 U.S.C. 154(b) by 0 days.

(21) Appl. No.: 15/466,938

(22) Filed: Mar. 23, 2017

(65) Prior Publication Data

US 2017/0194093 A1     Jul. 6, 2017

Related U.S. Application Data

(63) Continuation of application No. PCT/CA2015/000494, filed on Sep. 23, 2015.

(60) Provisional application No. 62/054,063, filed on Sep. 23, 2014.

(51) Int. Cl.
| | |
|---|---|
| H02M 1/12 | (2006.01) |
| H02M 3/24 | (2006.01) |
| H01F 38/14 | (2006.01) |
| H02M 3/158 | (2006.01) |
| H02M 1/44 | (2007.01) |

(52) U.S. Cl.
CPC ........... *H01F 38/14* (2013.01); *H02M 1/12* (2013.01); *H02M 3/24* (2013.01); *H02M 1/44* (2013.01); *H02M 3/158* (2013.01)

(58) Field of Classification Search
CPC ............. H02M 1/12; H02M 1/4258; H02M 2001/0064; H02M 1/10; H02M 1/44; H02M 1/42; H02M 1/425; H02M 3/04; H02M 3/155; H02M 3/158; H01F 38/14
See application file for complete search history.

(56) References Cited

U.S. PATENT DOCUMENTS

| | | | | | |
|---|---|---|---|---|---|
| 4,504,896 | A | * | 3/1985 | Easter | .......... H02M 3/335 323/222 |
| 4,577,268 | A | * | 3/1986 | Easter | .......... H02M 3/335 323/222 |

(Continued)

FOREIGN PATENT DOCUMENTS

WO           96/21894 A1       7/1996

OTHER PUBLICATIONS

International Search Report dated Dec. 21, 2015 issued from the Canadian Intellectual Property Office relating to PCT International Application No. PCT/CA2015/000494.

(Continued)

*Primary Examiner* — Gustavo Rosario Benitez

(57) ABSTRACT

There is provided an electronic direct current transformer circuit configuration for transferring power from a source to a load using magnetic storage coupling, the circuit comprising: an input node adapted to receive an input alternating current power source having an input direct voltage waveform; the magnetic storage coupling unit comprising: a first set of windings coupled to a first switch, a second set of windings located in series with the first set of windings with; a second switch connected at one end between the first and second set of windings and at another end to a common ground or common connection, the first and second switches having a switching frequency in a kilohertz range and switching between on and off in alternating modes; and an output node connected to the second set of windings.

22 Claims, 5 Drawing Sheets

(56) References Cited

U.S. PATENT DOCUMENTS

| | | | | |
|---|---|---|---|---|
| 5,321,348 A | * | 6/1994 | Vinciarelli | H02M 3/156 |
| | | | | 323/222 |
| 5,432,431 A | * | 7/1995 | Vinciarelli | H02M 3/155 |
| | | | | 323/222 |
| 6,714,426 B1 | * | 3/2004 | Guo | H02M 3/1584 |
| | | | | 363/134 |
| 6,784,644 B2 | * | 8/2004 | Xu | H02M 3/158 |
| | | | | 323/225 |
| 6,822,427 B2 | | 11/2004 | Wittenbreder | |
| 6,934,166 B2 | | 8/2005 | Vinciarelli | |
| 7,161,331 B2 | | 1/2007 | Wai et al. | |
| 7,382,113 B2 | | 6/2008 | Wai et al. | |
| 2005/0212496 A1 | * | 9/2005 | Sutardja | G05F 1/652 |
| | | | | 323/222 |
| 2007/0046270 A1 | * | 3/2007 | Tsuruya | H02M 3/1582 |
| | | | | 323/247 |
| 2009/0262557 A1 | | 10/2009 | Asuke | |
| 2012/0181871 A1 | * | 7/2012 | Johansen | H02J 9/062 |
| | | | | 307/66 |
| 2014/0022828 A1 | * | 1/2014 | Metzler | H02M 1/4258 |
| | | | | 363/44 |
| 2014/0286065 A1 | * | 9/2014 | Rinaldi | H02M 5/257 |
| | | | | 363/124 |
| 2015/0048810 A1 | * | 2/2015 | Terui | H02M 3/158 |
| | | | | 323/271 |

OTHER PUBLICATIONS

Written Opinion dated Dec. 21, 2015 issued from the Canadian Intellectual Property Office relating to PCT International Application No. PCT/CA2015/000494.

Extended European Search Report, dated Mar. 22, 2018, in European Patent Application No. 15843123.9.

* cited by examiner

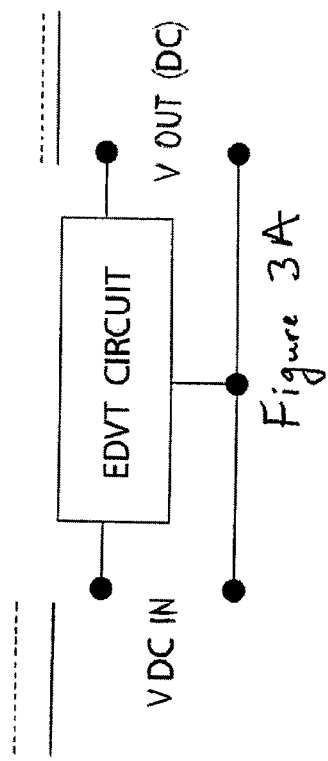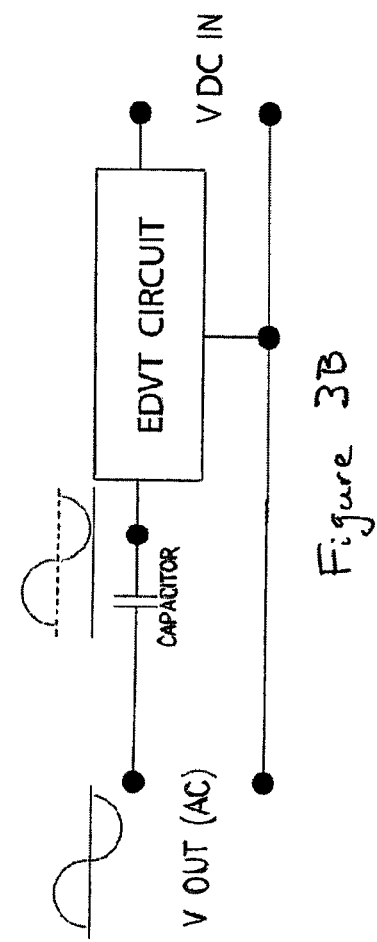

ELECTRONIC DIRECT VOLTAGE TRANSFORMER

FIELD OF THE INVENTION

The present invention relates generally to an electronic direct voltage transformer (EDVT) circuit and more particularly to a circuit for transferring direct voltage (commonly referred to as DC) power from a source to a load using magnetic storage coupling.

BACKGROUND OF THE INVENTION

Existing technologies that transfer power from a source to a load utilize converters that use capacitors as DC capacitive storage. Typically, DC capacitive storage systems have been used for size, and cost reasons. In such cases, the energy is stored within the capacitor as $½CV^2$. That is, generally speaking, the capacitor stores energy in the form of an electrical charge that produces a potential difference across the capacitor plates. One of the issues with such circuits is that they require rectification, direct wire connection, current pulses, DC regulator circuits for DC output, inverters to reproduce square wave outputs or more complex digital to analog power shapers to recreate AC sine waves and other such complexities. Additionally, such previous electronic converter circuits using DC capacitive storage typically receive an input alternating current (AC) signal and are converted to direct current (DC) to allow for the energy storage within the capacitor thereby outputting a DC signal to a load Existing converters change from high voltage DC input to a lower voltage DC output by storing by charging an inductor and allowing the current to continue flowing to the load thru a free-wheeling diode or some other active return switch. It should be noted that this is a one directional path of power from input to output. When there is little or no load connected, there usually is a minimum discharge circuit and the charging pulsed must be minimized or shut off periodically to prevent overvoltage at the load side. Additionally, minimum on/off pulses force a limit to the maximum ratio of output to input voltage range.

SUMMARY OF THE INVENTION

It would be advantageous to provide a circuit for transferring power to a load from a source to transfer the energy such as to obviate or mitigate the disadvantages of capacitive storage solutions.

According to one aspect, there is provided an electronic direct current (DC)transformer circuit comprising an input node adapted to receive an input direct current (DC) power source having an input voltage the magnetic storage coupling unit comprising: a first set of windings coupled to a first bi-directional AC switch, the first bidirectional AC switch for receiving an input charging current associated with the input voltage; a second set of windings located in series with the first set of windings, the first and second set of winding sharing a common core; a second bi-directional AC switch connected at one end between the first and second set of windings and at another end to a common ground or common input output connection, the first and second bi-directional AC switches having a convenient switching frequency and switching between on and off in alternating modes; and an output node connected to the second set of windings, the output node adapted to provide an output DC power the output power having an output voltage with an amplitude based on the input voltage and at least one of: a winding ratio of the first and second set of windings, a polarity of the first and second set of windings and a duty cycle of the first and second bi-directional AC switches; wherein the magnetic storage unit is configured to receive said input power and transfer the input power between the input node to an output node such that the first set of windings and the second set of windings are configured to provide magnetic storage of energy based on each of the first and the second bi-directional AC switches being continuously switched. If the output node voltage is higher than the equivalent transfer constant voltage, power will flow from the load to the source, as would be expected from a true bi-directional transfer circuit. The output voltage will be a function of the variable pulse duty cycle and not the load level current as in classical converter circuits. The switching frequency of the system can be chosen to minimize circuit elements such as the inductor and capacitors and other parameters such acoustic switching noise by operating above the audible frequency range. It is noted that the energy is stored in the inductor system and the capacitors are simple frequency low pass filters and not energy storage capacitors such as used in classical DC power converter systems In some aspects, the input DC power and the output DC power can be a a smooth non fluctuating DC voltage. In other aspects, the input can be a varying level voltage source and the system will faithfully transform the varying input shape to the load using constant on/off pulse rates thereby providing a fixed transfer function not dependent on the load current. Or by using feedback systems, the output can be maintained at a constant level by varying the pulse width and affecting the system transfer constant. Still in other aspects the circuit can further comprising a capacitor located between the second set of windings and the common ground, the capacitor configured to suppress high frequency components as a result of the switching frequency selected of the output signal at the output node. In yet other aspects, the output voltage signal can be further dependent upon a turns ratio of the first set of windings relative to the second set of windings such that varying at least one of the turns ratio and the duty cycle directly varies the output voltage signal amplitude. In still other aspects, the circuit can provide a predefined constant ratio of voltage transfer from the input node to the output node. In yet another aspect, the circuit can comprise a second capacitor located between the first bi-directional switch and the common ground, the second capacitor configured to suppress high frequency current components at the input node. In a related aspect, the circuit can further comprise an input inductor located between the input node and the first bi-directional switch and an input capacitor located between the input node and the common ground, the input inductor cooperating with the input capacitor to provide additional suppression of high frequency components at the input node. In a further aspect, the input and output powers, voltages and currents have limited frequency content of the switching frequency components generated by the switching frequency.

In some aspects, there can be a first duration where the first bi-directional AC switch is on and the second bi-directional switch is off, a current is permitted to flow from the first and second sets of windings to the load, the first and second sets of windings being magnetically charged for the first duration that the first bi-directional AC switch is closed. In a further aspect, there can be a second duration where the second bi- directional AC switch is on and the first bi-directional switch is off, the current ceases to flow at the first set of windings and the current at the load point is maintained by the second set of windings as it magnetically discharges. In still further aspect, the magnetic storage unit can be configured to maintain a constant output voltage ratio to the supply input voltage for the load during the switching operation of the first and the second bidirectional AC switch. In still a further aspect, the output voltage can be varied proportionally based on at least one of a turns ratio of the first set of windings relative to the second set of windings and the duty cycle. In another aspect, the inductor can be charged from the load side by providing a voltage power source at the load node that is higher than the system transfer constant. In this case, power will flow from the load to the source.

In other aspects, the first and second switches can be operated at only certain durations such that only a portion of the input voltage waveform is transferred to the load. In still other aspects, feedback can be used to control the duty cycle of the first and second bi-directional AC switches to provide a more stable output with respect to variations of input voltage.

The present invention relates generally to an electronic direct voltage transformer (EDVT) circuit and more particularly to a circuit for transferring direct voltage (commonly referred to as DC) power from a source to a load using magnetic storage coupling and similarly allow power to flow from the load side to the input side when higher than transfer voltages are present at the load side. Thus comprising a true bidirectional power transformer.

BRIEF DESCRIPTION OF THE DRAWINGS

Embodiments of the present invention will now be described by way of example only with reference to the following drawings in which:

FIG. 3A is a block diagram of the electronic direct voltage transformer circuit of FIGS. 1A-1E;

FIG. 3B is a block diagram of the electronic direct voltage transformer circuit of FIG. 3A showing an inverter to recreate an AC waveform using duty cycle modulations.

DETAILED DESCRIPTION OF THE PREFERRED EMBODIMENT

Figure 1A:
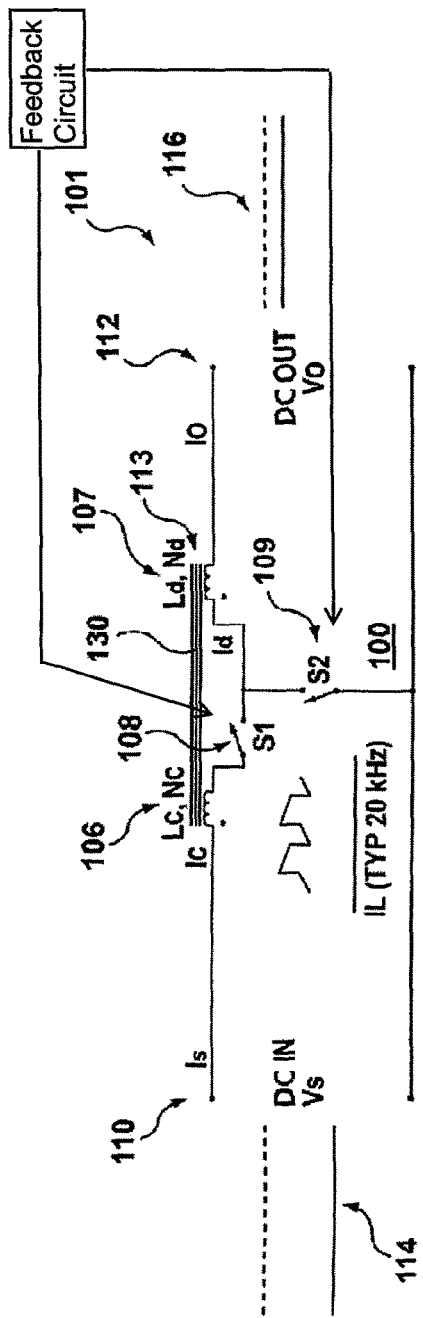
FIG. 1A is a schematic drawing of an electronic direct voltage transformer circuit.

For convenience, like numerals in the description refer to like structures in the drawings. Referring to FIGS. 1A-1E generally, alternate circuit schematic arrangements are shown, in accordance with different embodiments, for an electronic sine wave transformer (hereinafter ESWT) circuit that allows the conversion or transfer of power from a source node to a load using magnetic storage coupling and high frequency pulses (provided by one or more switches) that are used to charge a magnetic storage unit comprised of one magnetically coupled core with multiple windings. That is, the magnetic storage of energy is handled by one core with multiple sets of windings that are coupled together and connected to one or more switches that provide the high frequency pulses to control the charging and discharging of the core and the sets of windings in the magnetic storage unit. Further, the magnetic storage coupling unit causes an input AC power and voltage to be transferred to the output (e.g. to a load) at a same operating frequency as the input power and voltage while using magnetic energy storage via a central storage core and a coupled number of sets of windings that are controlled by one or more switches.

Specifically, an input DC power supply provides an input supply voltage to a magnetic storage coupling unit. The magnetic storage coupling unit as will be described, is implemented in the form of a common core with one or more sets of windings and at least two bi-directional AC switches (e.g. a first and a second bidirectional switch) that are alternately turned on and off and supply high frequency magnetic pulses to the common core windings (shown having inductance Lc, Ld) and to the load. At least one of the switches is coupled to a first one of the sets of windings in series, while another one of the switches is coupled between the sets of windings and a common ground. Further, the first and second switch are switched in opposite modes (i.e. the first switch is on and the second switch is off, and vice versa) at the switching frequency In this manner, the first and second sets of windings (e.g. taken in combination) only see short charging pulses and also short discharging pulses between charging pulses.

That is, in one mode where the first switch is on (and the second switch is off), both the first and second sets of windings collectively get charged and store energy therein. In this case, the current flows through both the sets of windings and the total energy or magnetic flux stored is: $E=\frac{1}{2}LI^2$. Where L refers to the inductance of the first and second sets of windings taken together and I is the magnetic charging current flowing therethrough.

In a second mode where the second switch is on (and the first switch is off), now the total current flows through only the second set of windings and thus the current is increased in order to maintain the magnetic flux at the start of the discharge pulse and then slowly decreases as energy is used to support load power. At an open circuit load condition, the charge current is in one polarity and the discharge current goes thru zero current and in the opposite direction so as to maintain a constant ratio of output voltage to input. That is, the output wave shape follows the input wave shape but the current alternates between one direction and the other to maintain zero net current flow. In the case where the load voltage is higher than the equivalent transfer constant voltage, the inductor system is charged during the on time of the second switch and discharged during the on time of the first switch. Thereby transferring power from the load to the source.

Further, the magnetic storage coupling unit, can allow the output voltage provided to the load to directly follow the shape of the input supply voltage Thus can provide a direct copy of the input waveform but at a proportional amplitude difference according to the ratio of the windings and the duty cycle of the electronic switches. The amplitude of the output voltage supplied to the load is a function of a voltage constant Kv and the input voltage supply amplitude. The relation is valid at the switching frequency which is essentially instantaneous at the power delivery switching frequency of the input power and by extension is valid for the complete input waveform or any portion thereof, including truncating or re-starting of the switching at any part of the input waveform. The voltage constant Kv is further dependent on the turns ratio (a measure of the ratio of the number of turns of the sets of windings relative to one another) and the duty cycle. That is, since the turns ratio is fixed, the output voltage can be controlled by the duty cycle of the switching frequency of the first and second switches. Therefore, the voltage change between the input and output happens at the magnetic storage unit. The net result is that energy is stored at the set of windings and discharged to the load (or from the load to the source) within the normal storage law of $\frac{1}{2}LI^2$. This means that the charge current slope is controlled by the charge voltage and Lc+Ld and the discharge slope is controlled by the output voltage and Ld only (or charged from the load and discharged to the source when the load voltage is higher than the equivalent voltage transfer dictated by the transfer constant Kv).

The end function of the EDVT is the somewhat the same as a conventional magnetic power transformer with an input winding and an output winding with the notable difference that the input/output values are DC. The following comparisons to AC voltage transformers is provided for relative reference only. Conventional AC transformers cannot transfer DC voltage. As will be understood with reference to FIGS. 1A-1E for example, one of the differences of the EDVT circuit presented herein for relative reference only to existing transformer circuits is that in known transformer circuits having windings without the use of switching as proposed herein, the full voltage and current for each half cycle needs to be supported inductively by the transformer, this commonly referred to as the magnetizing inductance. Conversely, in the EDVT circuit discussed herein, the inductance (e.g. first and second sets of windings located in series) are charged for short pulses at a time (during the high switching frequency) and similarly discharge magnetically for short pulses. Additionally, in terms of size, existing transformer circuits can have a typical weight of around 100 lbs to accommodate the large magnetizing inductance, whereas the EDVT circuit presented herein has a significantly smaller size (e.g. 1 lb)

In accordance with FIGS. 1A-1E, the EDVT circuit uses magnetic storage and is inherently bi-polar. That is, the energy can be stored in both polarities without any changes. This is not possible with conventional transformers.

Further to expand on the advantages presented with the electronic direct voltage transformer of FIGS. 1A-1E over the conventional AC transformer, for reference only, a conventional transformer can be represented with an input leakage inductance, mutual inductance and output leakage inductance. All with the appropriate turns ratio applied. That is, the mutual inductance of the sets of windings in the circuit is the controlling element. At maximum working voltage the core flux is below saturation (i.e. typically 15 kGauss). The ampere-turns resulting from the applied voltage (at 50/60/400 Hertz) is such that the flux created by the volt-sec (area under one half sine) divided by the core area is less than saturation point of the core material. A typical multi-KVA transformer measures at 1 Henry with a weight of approx. 50-100 lb. with an included motorized control to allow variability. Preferably, the ESWT circuit of FIGS. 1A-1E charges and discharges the magnetic flux storage element with only sufficient flux to cover one high frequency cycle (kilohertz) to ferrite saturation levels that are typically 3 kGauss. In a preferred embodiment, the voltage transfer ratio works for sine waves and non-sinusoidal waveforms as well as DC waveforms. Further preferably, the magnetic storage unit 100 presented in FIGS. 1A-1E weighs only 1 lb. Therefore there is material saving, cost and increased flexibility as well as decreased complexity of DC to DC transformation. The instantaneous and electronically variable nature of the transformer circuit of FIGS. 1A-1E allows control without any mechanical wear items.

As mentioned, the first and second switches of the magnetic storage unit have a switching frequency that can many kilohertz. For example, preferably the switching frequency is in the kHz range and typically is much greater than 100 times the base power frequency of normal AC power transformation, which is in the hertz range. This also means that there are no harmonics below the kHz range switching frequency. In this manner, power harmonics of the output power, provided at the output of the magnetic circuit that is being supplied to the load is minimized and for all practical purposes the power harmonics are non existent. Additionally, the inductance sizes in the magnetic circuit and any capacitors used in the electronic direct voltage transformer circuit for suppressing high frequencies above the hertz range are minimized.

Referring now to FIGS. 1A-1E, shown are exemplary embodiments of an electronic direct voltage transformer circuit illustrated generally by reference numerals 101-105 according to alternate embodiments.

Referring to FIG. 1A, shown is the electronic direct voltage transformer circuit 101. The electronic direct voltage transformer circuit 101 comprises an input node 110, an output node 112 and a magnetic storage unit 100 coupled electrically between the input node 110 and the output node 112 connected to a load. The input node 110 is located at the source side for receiving an input DC (direct voltage) power source having an input supply voltage 114. The magnetic storage unit 100 then serves to transform or transfer power from the source side to the load using high frequency magnetic energy storage or charged from the load and discharged to the source when the load voltage is higher than the equivalent voltage transfer dictated by the transfer constant Kv. Magnetic storage unit 100 comprises a common core 130 having one or more sets of windings (e.g. a first set of windings 106 and a second set of windings 107) for storing energy magnetically within common core 130 (referred to as storage node 113). The magnetic storage unit 100 further comprises two or more switches (e.g. a first switch 108 and a second switch 109). The first and second switches 108-109 are AC bidirectional switches, illustrated generally at 140, that are switched on, alternately, that is opposite to one another and have a switching frequency in a kilohertz range.

Referring to the magnetic storage unit 100, the first set of windings 106 and second set of windings 107 are magnetically coupled together by common core 130. Preferably, the second set of windings 107 is located in series aiding or series opposing connection with the first set of windings 106 within a common magnetic path. Additionally, the first switch 108 is directly connected to the first set of windings 106 (and can be located on either side of first set of windings 106 as illustrated in the difference between FIGS. 1A and 1C). The second switch 109 is connected between the two set of windings 106, 107 and the common ground. The output node 112 is then connected to the second set of windings 107 such that the output node provides an output DC power, and an output DC voltage 116. Further the amplitude or magnitude of the output voltage 116 is based on one or more of: a winding ratio between first and second sets of windings 106,107, a polarity of the first and second set of windings 106, 107 and the duty cycle of the switching frequency of the first and second switches 108, 109. As will be described, the magnetic storage unit 100 is configured to receive the input power and transfer it to the output node 112 such that the first and second set of windings 106, 107 provide magnetic storage of energy in a continuous fashion therein even while the first and second switches 108 and 109 are being alternately and in an opposing manner being switched on and off.

In one example, referring to FIG. 1A and the magnetic storage unit 100, the switch 108 and 109 duty cycle is set at a predefined number the set of windings 106, 107 are coupled together and each have a predefined number of windings. Referring to FIG. 1A, Nd refers to the number of windings to produce the inductance Ld of second set of windings 107, and Nc refers to the additional turns to produce the inductance Lc (referring to the combination of the first and second set of windings 106, 107). That is, Nc+Nd produces the inductance Lc+Ld. The inductance is proportional to the number of turns squared.

The following describes the general mode of operation of the magnetic storage unit referred to in each of FIGS. 1A-1E. In the first mode of operation, when the first switch 108 is switched on (and second switch 109 is switched off), the line current flows through the first and second sets of windings 106, 107 (storage node 113) to the load at output node 112. In this manner, the output current Io is equivalent to the input current Is which is equivalent to the current flowing through the set of windings Ic and Id. In this manner, the current flowing through the sets of windings 106, 107 supports the load current (Io) plus the magnetic charging current. That is, the combination of both sets of windings 106, 107 (storage node 113) preferably supports the desired peak output current Io plus the peak charging current and the current flowing through the second set of windings 107 similarly must support the peak limits of the discharge current. That is, the magnetic energy flux (known as BH) load of the common core 130 of storage node 113 preferably does not reach saturation with the peak ampere-turns mentioned above.

Referring again to FIGS. 1A-1E, the input supply voltage 114, is preferably a DC waveform, and the output voltage 116 at output node 112 is also a DC waveform Preferably, referring to FIGS. 1A-1E, the switching frequency of switches within the magnetic storage unit 100 (e.g. the first switch 108 and the second switch 109) is in the kilohertz range (e.g. 20 kHz). That is, as will be described, the magnetic storage unit 100, facilitates transforming a power DCvoltage input to a power DCvoltage output at the load by transforming or transferring the input energy using magnetic energy storage as the transfer medium.

Referring again to the first mode of operation, when the first switch 108 is switched on, the current flows through the first and second sets of windings 106, 107 (which are in series in this mode) to the load.

Generally speaking, the instantaneous output voltage at node 112, is defined as: $v_o = k_v V_s$ and the output current at node 112 is $I_o = V_o/Z_L$ where Kv is a predefined constant that is dependent on the turns ratio between the first and second sets of windings 106, 107 (e.g. specifically on the number of turns Nc of the first set of windings 106 relative to the number of turns Nd of the second set of windings 107). That is, $K_v$ is a function of the turns constant $K_i$ and the charge/discharge ratio $K_x$ as defined below. Further, the charge/discharge ratio is dependent upon delta-tc, the time to switch from the first switch 108 being switched on to the second switch 109 being switched on and delta-td which is the discharge time when the second switch 109 is on (first switch 108 is off).

This can be further understood as:

$$K_v = K_i \frac{\Delta t_c}{K_i \Delta t_c + \Delta t_d} = \frac{1}{\frac{1}{K_x} + 1}, \text{ constant for ratio of } V_0 \text{ to } V_s$$

Where $K_x = \frac{\Delta t_c}{\Delta t_d} K_i$ and $$K_i = \left(\frac{N_d}{N_c + N_d}\right), \text{ constant for ratio of } I_c(avg) \text{ to } I_d(avg).$$

As seen by the instantaneous values of the output voltage 116, a constant duty cycle will yield a constant output voltage 116 relative to the input voltage 114 and thereby transform an inputDC waveform to an outputDC waveform.

Figure 2:
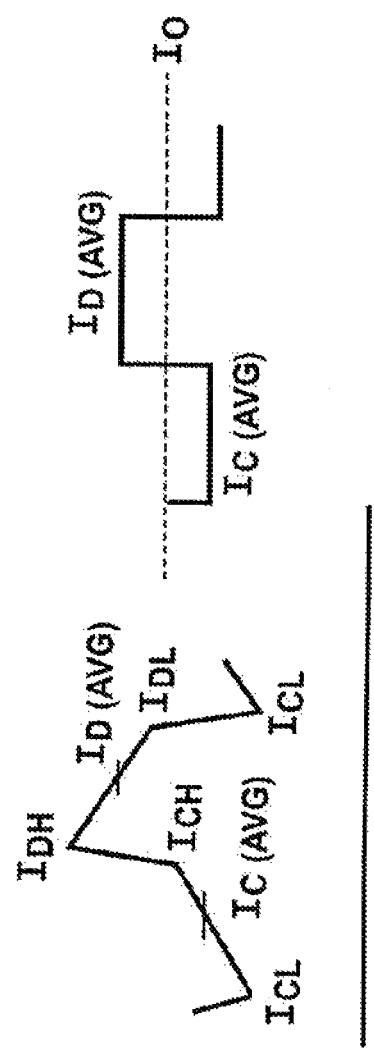
FIG. 2 is an illustration of the current waveform of the current through the storage set of windings and a current waveform illustrating the average current through the storage set of windings.

Referring now to the current waveform of FIG. 2 illustrating the current through the storage node 113. Further, in the first mode, the current flowing through the storage node 113 increases from Icl to Ich while the first switch 108 is on and the second switch 109 is turned off. The current increase can be shown as follows:

$$I_{cl}(N_c + N_d) = I_{dl}N_d, I_{cl} = I_{dl}\left(\frac{N_d}{N_c + N_d}\right) = I_{dl}K_i$$

$$I_{ch}(N_c + N_d) = I_{dh}N_d, I_{ch} = I_{dh}\left(\frac{N_d}{N_c + N_d}\right) = I_{dh}K_i, K_i = \left(\frac{N_d}{N_c + N_d}\right)$$

$$\Delta I_c = I_{ch} - I_{cl} = (I_{dh} - I_{dl})K_i, \Delta I_c = \Delta I_d K_i$$

Subsequently, in the second mode, the first switch 108 is switched off and the second switch 107 is switched on, now all the current flows through the second set of windings 107 only, and the current instantly increases from Ich to Idh to maintain the conservation of energy in the magnetic field. That is, the current magnitude increases by the turns ratio difference. For example, in a scenario where Nc of set of windings 106 is equivalent to Nd of set of windings 107 then the current flowing through the second set of windings 107 increases to Idh (e.g. doubles in value compared to the current just before switch 108 is turned off in this case). Subsequently, during the following predefined discharge time interval while the second switch 107 is conducting, the current through the storage node 113 slowly decreases from Idh to Idl, the relation being shown above. Further, the current instantly decreases at the end of the discharge time interval when the second switch 109 is turned off and the first switch 108 is turned back on, from Idl to Icl.

As can be seen, a constant flux is maintained even during the time that each switch 108, 109 is turned on/off and during the transitions between modes. That is, the magnetic field and energy stored within the magnetic storage node 113 is kept constant during the switching modes from charge/discharge/charge.

The continuous storage of energy described in reference to the magnetic storage unit 100 of FIGS. 1A-1E refers to the fact that during the first and second mode of operations and switching therebetween (e.g. switching from the first switch 108 being turned on to the second switch 109 being turned on), the input-output voltage ratios (114 and 116) are maintained as the magnetic field and the energy stored within the storage node 113 remains constant as defined by $E=½LI^2$. That is, in a preferred embodiment, a constant ratio of voltage transfer from the source side to the load side is maintained irrespective of the input sine wave shape (e.g. input supply voltage 114) and the input sine wave shape of voltage 114 is converted at the fixed transfer ratio (e.g. determined as mentioned earlier by the Kv constant) to the load side as output voltage 116. The load impedance will thus determine the output current.

The mathematical relationships of voltages and currents used in FIGS. 1A-1E can be further understood as follows:

During the charge and discharge times, $V_s$ and $V_o$ remain essentially unchanged because the switching frequency is a very high frequency (typically 20 kHz switching). Therefore, the voltage and inductance of one of the sets of windings is given by:

$$V = L\frac{\Delta i}{\Delta t}, L = A_L N^2, A_L = \text{magnetic core inductance factor,}$$

$N = $ number of turns $V_s = $ instantaneous value of the DC input waveform $V_o = $ instantaneous value of the DC output waveform $$\Delta I_d = V_o \frac{\Delta t_d}{A_L N_d^2}$$

$$\Delta I_c = (V_s - V_o)\frac{\Delta t_c}{A_L(N_c + N_d)^2}$$

$$\Delta I_c = K_i \Delta I_d = K_i \frac{V_o \Delta t_d}{A_L N_d^2}$$

$$(V_s - V_o)\frac{\Delta t_c}{A_L(N_c + N_d)^2} = K_i \frac{V_o \Delta t_d}{A_L N_d^2}$$

$$(V_s - V_o)\frac{\Delta t_c}{A_L(N_c + N_d)^2} \frac{A_L N_d^2}{\Delta t_d} = (V_s - V_o)\frac{\Delta t_c}{\Delta t_d}K_i^2 = K_i V_o,$$

$$K_x = \frac{\Delta t_c}{\Delta t_d} K_i$$

$$K_x(V_s - V_o) = V_o$$

$$V_o(1 + K_x) = K_x V_s$$

$$V_o = \frac{K_x}{1+K_x}V_s = \frac{1}{\frac{1}{K_x}+1}V_s = K_v V_s, K_v = \frac{1}{\frac{1}{K_x}+1}$$

Note that $K_v$ is a only a function of the turns constant $K_i$ and the duty cycle $K_x$ $$\Delta I_d = V_o \frac{\Delta t_d}{A_L N_d^2} = K_v V_s \frac{\Delta t_d}{A_L N_d^2} = K_D V_s, K_d = \frac{K_v \Delta t_d}{A_L N_d^2},$$

$$\Delta I_c = \Delta I_d K_i = K_i K_d V_s$$

Note that the current ripple magnitude in the storage element 113 is a function of $V_s$, the inductance values and the duty cycle.

The constants are:

$$K_i = \left(\frac{N_d}{N_c + N_d}\right), \text{constant for ratio of } I_c(avg) \text{ to } I_d(avg)$$

$$K_o = \frac{\Delta t_c + \Delta t_d}{K_i \Delta t_c + \Delta t_d}, \text{constant for ratio of } I_o \text{ to } I_c(avg), I_d(avg)$$

$$K_x = \frac{\Delta t_c}{\Delta t_d}K_i$$

$$K_v = K_i \frac{\Delta t_c}{K_i \Delta t_c + \Delta t_d} = \frac{1}{\frac{1}{K_x}+1}, \text{constant for ratio of } V_0 \text{ to } V_s$$

$$K_d = \frac{K_v \Delta t_d}{A_L N_d^2}, \text{constant for ratio of ripple } \Delta I_c, \Delta I_d$$

The following are the simplified working relations:

$$V_o = K_v V_s$$

$$\Delta I_d = K_d V_s$$

$$\Delta I_c = K_i K_d V_s$$

$$I_o = \frac{V_o}{Z_L}$$

$$I_d(avg) = K_o I_o$$

$$I_c(avg) = K_i K_o I_o$$

$$D = \frac{\Delta t_c}{\Delta t_c + \Delta t_d}, \text{duty cycle}$$

$$I_s = D \, I_c(avg) = D K_i K_o I_o$$

$$D K_i K_o = \frac{\Delta t_c}{\Delta t_c + \Delta t_d} K_i \frac{\Delta t_c + \Delta t_d}{K_i \Delta t_c + \Delta t_d} = K_v$$

$$V_s I_s = \frac{1}{K_v} V_o K_v I_o = V_o I_o$$

Further, the values for currents flowing through the transformer circuits of 101-105 can be calculated as follows:

$$I_c(avg) = \frac{I_{ch} + I_{cl}}{2} = \frac{I_{dh} + I_{dl}}{2}K_i = I_d(avg)K_i$$

$$\Delta I_c = I_{ch} - I_{cl} = (I_{dh} - I_{dl})K_i, \Delta I_c = \Delta I_d K_i$$

$$I_o = \frac{I_c(avg)\Delta t_c + I_d(avg)\Delta t_d}{\Delta t_c + \Delta t_d} =$$

$$\frac{K_i I_d(avg)\Delta t_c + I_d(avg)\Delta t_d}{\Delta t_c + \Delta t_d} = I_d(avg)\frac{K_i \Delta t_c + \Delta t_d}{\Delta t_c + \Delta t_d}$$

$$I_d(avg) = K_o I_o, K_o = \frac{\Delta t_c + \Delta t_d}{K_i \Delta t_c + \Delta t_d}$$

Note that $I_c(avg)$, $I_d(avg)$ are a function of the load current, duty cycle and the number of turns of the storage set of windings.

$$I_o = \frac{V_o}{Z_L}, Z_L = \text{load impedance}$$

It is noted that the operation of the magnetic storage unit 100 described in reference to FIG. 1A applies similarly to FIGS. 1B-1E.

Figure 1B:
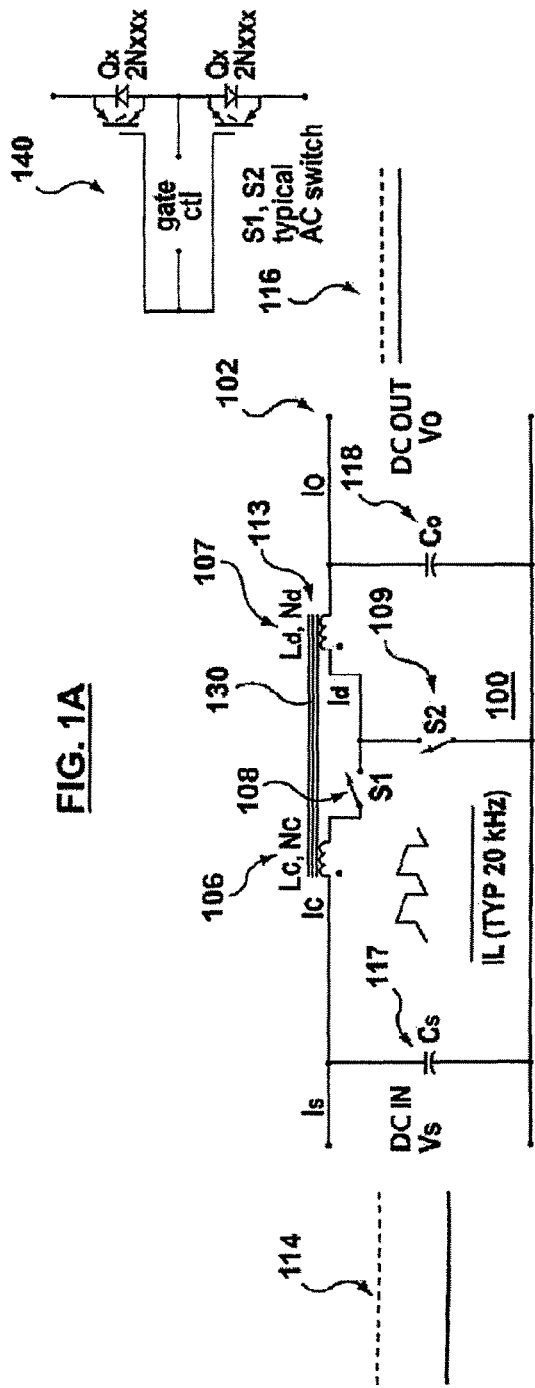
FIG. 1B is a schematic drawing of an electronic direct voltage transformer circuit according to another embodiment.
Figure 1C:
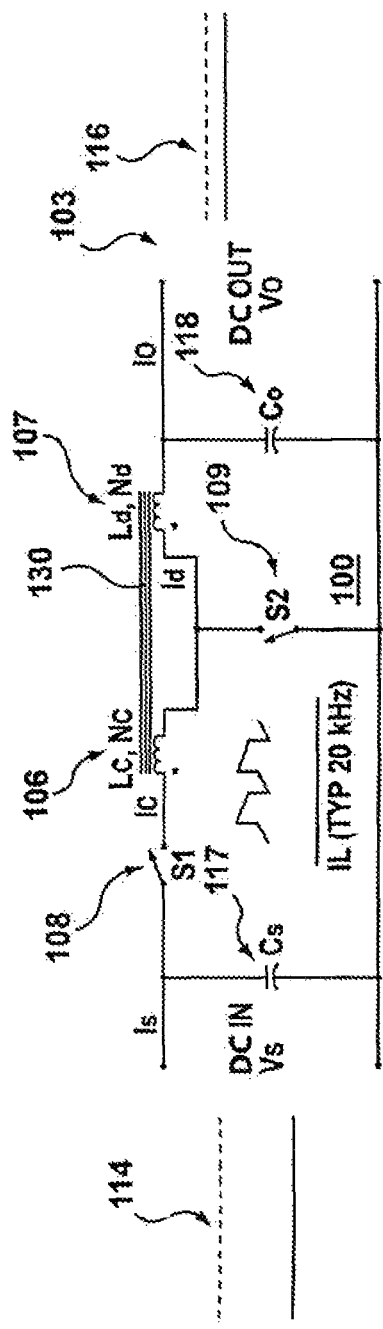
FIG. 1C is a schematic drawing of an electronic direct voltage transformer circuit according to another embodiment.

In one embodiment referring to FIG. 1B and 1C, shown is an electronic direct voltage transformer 102, 103 according to alternate embodiments where an input capacitor 117 located between the first switch 108 and/or the first set of windings 106 and the common ground. The input capacitor 117 is configured for cooperating with both the first and second sets of windings 106, 107 to suppress the high frequency current components in the kilohertz range from the input supply side of the EDVT circuit 102, 103 respectively. Further, there is provided an output capacitor 118, located between the second set of windings 107 and the common ground (e.g. across the load), the output capacitor 118 configured for cooperating with the first and second sets of windings 106, 107 to suppress the high frequency components in the kilohertz range (e.g. generated by the high frequency switching rate of the first and second switches 108, 109) of the output power/voltage at the output node.

Figure 1D:
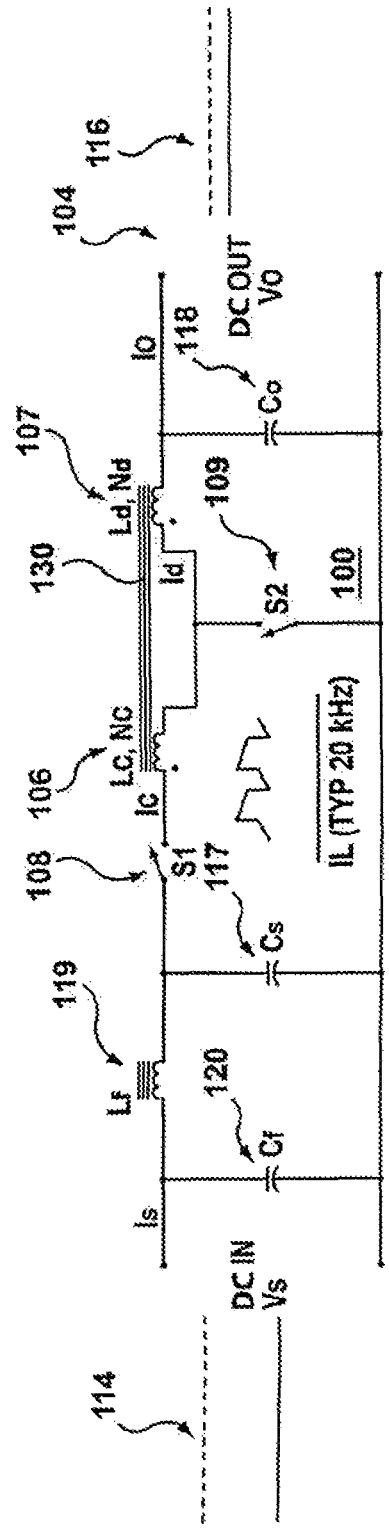
FIG. 1D is a schematic drawing of an electronic direct voltage transformer circuit according to another embodiment.
Figure 1E:
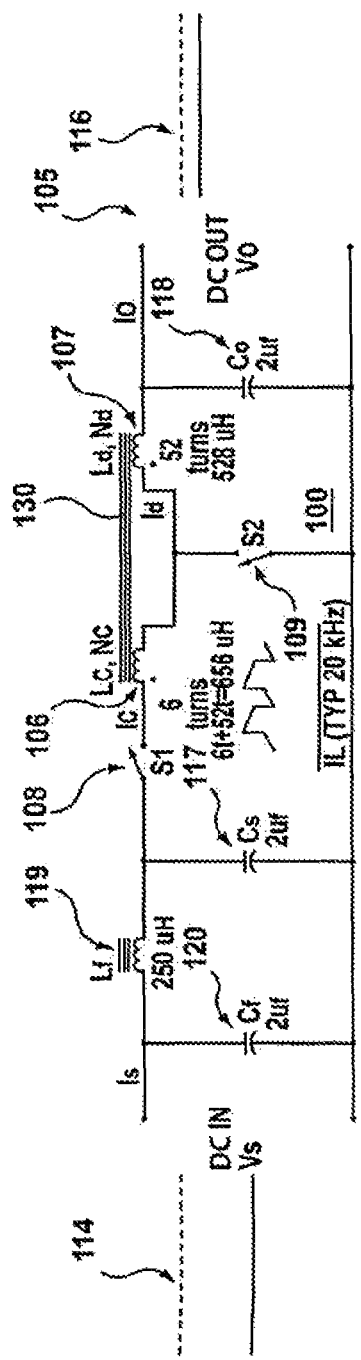
FIG. 1E is schematic drawing of an electronic direct voltage transformer circuit according to another embodiment.

In yet another embodiment referring to FIG. 1D, there is provided an input inductor 119 located between the input node and the first switch 108 and a filtering capacitor 120 located between the input node and the common ground. The input inductor 119 cooperating with the input capacitor 120 to provide additional suppression of high frequency components from the input signal (e.g. 114) provided to the magnetic storage unit 100. FIG. 1E provides some exemplary values for the components to filter the appropriate frequencies in a line frequency embodiment.

In a preferred embodiment of FIGS. 1A-1E, the input and output powers, voltages and currents have no harmonic content below the switching frequency, including the absence of the kilohertz high frequency component.

In yet another embodiment (not illustrated), the first and second switches 108, 109) are operated at only certain portions of input waveform of the input supply voltage 114 such that only a portion of the input voltage 114 waveform is transferred to the load as output voltage 116.

In yet another embodiment illustrated in FIG. 3B, the output can be a power source (e.g. 114) and can be a DC voltage and the switches 108, 109 duty cycles are modulated at regular repeating variations so as to produce varying output voltages 116 which are selected from linear sinusoid voltages or non-linear output voltages to the input 114. In this case DC power can be transferred to an alternating voltage (AC) power line.

In yet another aspect of the EDVT 101-105 of FIGS. 1A-1E, it is noted that the ripple currents (shown as delta Ic) are not affected by the load current Io. That is, when the load is disconnected such as to cause a zero load current, there will only be the ripple current component above and below zero at the high frequency. The output voltage 116 will still be defined by the ratio to the input voltage 114 defined above.

In some embodiments, a feedback circuit can be used to monitor output waveform 116 that is used to alter the duty cycle of the switches 108,109 to provide a more stable output voltage with respect to the input voltage or provide a more stable input voltage when charged from the load and discharged to the source when the load voltage is higher than the equivalent voltage transfer dictated by the transfer constant Kv.

Accordingly, it will be appreciated by a person of ordinary skill in the art that the present invention provides improved flexibility for the electronic direct voltage transformer circuits by allowing electronic timing switching controls of the output voltage provided to a load and allowing an DC input power to be supplied as an output DC power or in reverse when charged from the load and discharged to the source when the load voltage is higher than the equivalent voltage transfer dictated by the transfer constant Kv such that the amplitude is dependent upon the turns ratio between the sets of windings and the duty cycle of the switches used in the magnetic storage unit 100 described herein. Therefore there is material saving, cost and increased flexibility. The electronics variable nature of the transformer circuit 101-105 allows control of output voltage, power and current without any mechanical wear items and at increased efficiencies.

Further, although the invention has been described with reference to certain specific embodiments, various modifications thereof will be apparent to those skilled in the art without departing from the scope of the invention as defined by the appended claims.

What is claimed is:

1. An electronic direct voltage (DC) transformer circuit comprising:
   an input node adapted to receive input power from a direct voltage power source;
   a magnetic storage coupling unit comprising:
      a first set of windings coupled to a first bi-directional AC switch, the first bi-directional AC switch for receiving an input charging current associated with an input voltage;
      a second set of windings located in series with the first set of windings, the first and second set of winding sharing a common core;
      a second bi-directional AC switch connected at one end between the first and second set of windings and at another end to a common ground, the first and second bi-directional AC switches having a switching frequency in a kilohertz range and switching between on and off in alternating modes; and
   an output node connected to the second set of windings, the output node adapted to provide an output DC power, the output DC power having an output voltage with an amplitude based on the input voltage and a winding ratio of the first and second set of windings and a duty cycle of the first and second bi-directional AC switches;
   wherein the magnetic storage unit is configured to receive input power and transfer the input power between the input node to the output node such that the first set of windings and the second set of windings are configured to provide magnetic storage of energy based on each of the first and the second bi-directional AC switches being continuously switched.

2. The circuit configuration of claim 1, wherein the input node is the source of power and an output load is a power absorber.

3. The circuit configuration of claim 2 further comprising a capacitor located between the second set of windings and the common ground, the capacitor configured to suppress high frequency components in the kilohertz range of the output voltage at the output node.

4. The circuit configuration of claim 2, wherein the output voltage is further dependent upon a turns ratio of the first set of windings relative to the second set of windings such that varying at least one of the turns ratio and the duty cycle directly varies the output voltage signal amplitude.

5. The circuit configuration of claim 2 providing a predefined constant ratio of voltage transfer from the input node to the output node, irrespective of an input wave shape, the input wave shape being converted at the predefined transfer ratio to the load.

6. The circuit configuration of claim 2 further providing a near zero power harmonic distortion in both the input power and the output DC power with a fixed duty cycle wherein the switching frequency is greater than about 100 times the input frequency such that no harmonics are present below the kilohertz switching frequency.

7. The circuit configuration of claim 2 further providing a harmonic correction for non-linear loads when the duty cycle is incrementally varied during a sine wave so as to correct for the anticipated fluctuations of said non-linear loads.

8. The circuit configuration of claim 3 further comprising a second capacitor located between the first bi-directional switch and the common ground, the second capacitor configured to suppress high frequency current components at the input node.

9. The circuit configuration of claim 8 further comprising an input inductor located between the input node and the first bi-directional switch and an input capacitor located between the input node and the common ground, the input inductor cooperating with the input capacitor to provide additional suppression of high frequency components at the input node.

10. The circuit configuration of claim 9 wherein the input power and the output DC power[s] has limited harmonic content other than the base power Hertz frequency content and the kilohertz high frequency component generated by the switching frequency are limited.

11. The circuit configuration of claim 2, wherein for a first duration where the first bi-directional AC switch is on and the second bi-directional switch is off, a current is permitted to flow from the first and second sets of windings to the load, the first and second sets of windings being magnetically charged for the first duration that the first bi-directional AC switch is closed.

12. The circuit configuration of claim 11, wherein during a second duration where the second bi-directional AC switch is on and the first bi-directional switch is off, the current ceases to flow at the first set of windings and the current at the load point is maintained by the second set of windings as it magnetically discharges.

13. The circuit configuration of claim 12, wherein the magnetic storage coupling unit is configured to maintain a constant output voltage ratio to the supply input voltage for the load during the switching operation of the first and the second bi-directional AC switch.

14. The circuit configuration of claim 13, wherein the output voltage is varied proportionally based on at least one of a turns ratio of the first set of windings relative to the second set of windings and the duty cycle.

15. The circuit configuration of claim 2 such that the first and second switches are operated at only certain durations of the input waveform such that only a portion of an input voltage waveform is transferred to the load.

16. The circuit configuration of claim 2 whereby the input power is DC voltage based and the first and second switches duty cycles are modulated at regular repeating Hertz rates with duty cycle variations so as to produce varying output voltages selected from: linear sinusoid voltages or non-linear outputs voltages to the load.

17. The circuit configuration of claim 2 whereby a feedback is used to control the duty cycle of the first and second bi-directional AC switches to provide a more stable output with respect to variations of an input voltage or in reverse when charged from the load and discharged to the source when the load voltage is higher than an equivalent voltage transfer dictated by a transfer constant Kv.

18. The circuit configuration of claim 2 whereby the power will flow from a load side to an input side when a load voltage is higher than a transformed voltage dictated by a constant Kv.

19. The circuit configuration of claim 2 whereby the power will flow from a load side to an input side when a load voltage is higher than a transformed voltage dictated by a constant Kv and the source voltage is direct voltage.

20. The circuit configuration of claim 2 whereby the power will flow from a load side to an input side when a load voltage is higher than a transformed voltage dictated by a constant Kv and the source voltage is alternating or direct voltage or a combination thereof.

21. An electronic direct voltage (DC) transformer circuit comprising:
an input node adapted to receive input power from a direct voltage power source;
a magnetic storage coupling unit comprising:
a first set of windings coupled to a first bi-directional AC switch, the first bi-directional AC switch for receiving an input charging current associated with an input voltage;
a second set of windings located in series with the first set of windings, the first and second set of winding sharing a common core;
a second bi-directional AC switch connected at one end between the first and second set of windings and at another end to a common ground, the first and second bi-directional AC switches having a switching frequency in a kilohertz range and switching between on and off in alternating modes; and
an output node connected to the second set of windings, the output node adapted to provide an output DC power, the output DC power having an output voltage with an amplitude based on the input voltage and at least one of: a winding ratio of the first and second set of windings, a polarity of the first and second set of windings and a duty cycle of the first and second bi-directional AC switches;
wherein the magnetic storage unit is configured to receive input power and transfer the input power between the input node to the output node such that the first set of windings and the second set of windings are configured to provide magnetic storage of energy based on each of the first and the second bi-directional AC switches being continuously switched;
wherein the input node is the source of power and an output load is a power absorber providing a near zero power harmonic distortion in both the input power and the output DC power with a fixed duty cycle wherein the switching frequency is greater than about 100 times the input frequency such that no harmonics are present below the kilohertz switching frequency.

22. An electronic direct voltage (DC) transformer circuit comprising:
an input node adapted to receive input power from a direct voltage power source;
a magnetic storage coupling unit comprising:
a first set of windings coupled to a first bi-directional AC switch, the first bi-directional AC switch for receiving an input charging current associated with an input voltage;
a second set of windings located in series with the first set of windings, the first and second set of winding sharing a common core;
a second bi-directional AC switch connected at one end between the first and second set of windings and at another end to a common ground, the first and second bi-directional AC switches having a switching frequency in a kilohertz range and switching between on and off in alternating modes; and
an output node connected to the second set of windings, the output node adapted to provide an output DC power, the output DC power having an output voltage with an amplitude based on the input voltage and at least one of: a winding ratio of the first and second set of windings, a polarity of the first and second set of windings and a duty cycle of the first and second bi-directional AC switches;

wherein the magnetic storage unit is configured to receive input power and transfer the input power between the input node to the output node such that the first set of windings and the second set of windings are configured to provide magnetic storage of energy based on each of the first and the second bi-directional AC switches being continuously switched;

wherein the input node is the source of power and an output load is a power absorber such that for a first duration where the first bi-directional AC switch is on and the second bi-directional switch is off, a current is permitted to flow from the first and second sets of windings to the load, the first and second sets of windings being magnetically charged for the first duration that the first bi-directional AC switch is closed and such that during a second duration where the second bi-directional AC switch is on and the first bi-directional switch is off, the current ceases to flow at the first set of windings and the current at the load point is maintained by the second set of windings as it magnetically discharges.

* * * * *

UNITED STATES PATENT AND TRADEMARK OFFICE
CERTIFICATE OF CORRECTION

PATENT NO. : 10,096,423 B2
APPLICATION NO. : 15/466938
DATED : October 9, 2018
INVENTOR(S) : Vito Rinaldi Page 1 of 1

It is certified that error appears in the above-identified patent and that said Letters Patent is hereby corrected as shown below:

On the Title Page

Item (63), under the Related U.S. Application Data, Line 2, "filed September 23, 2015" should read --filed September 18, 2015--.

Signed and Sealed this
Third Day of September, 2019

Andrei Iancu
*Director of the United States Patent and Trademark Office*